Sept. 11, 1928.                                                1,684,344
                    J. C. CARLTON
    TRANSMISSION FOR RADIAL DRILL ARMS, ELEVATING MECHANISM,
                    AND DRILL SPINDLES
                  Filed Jan. 9, 1926            3 Sheets-Sheet 3

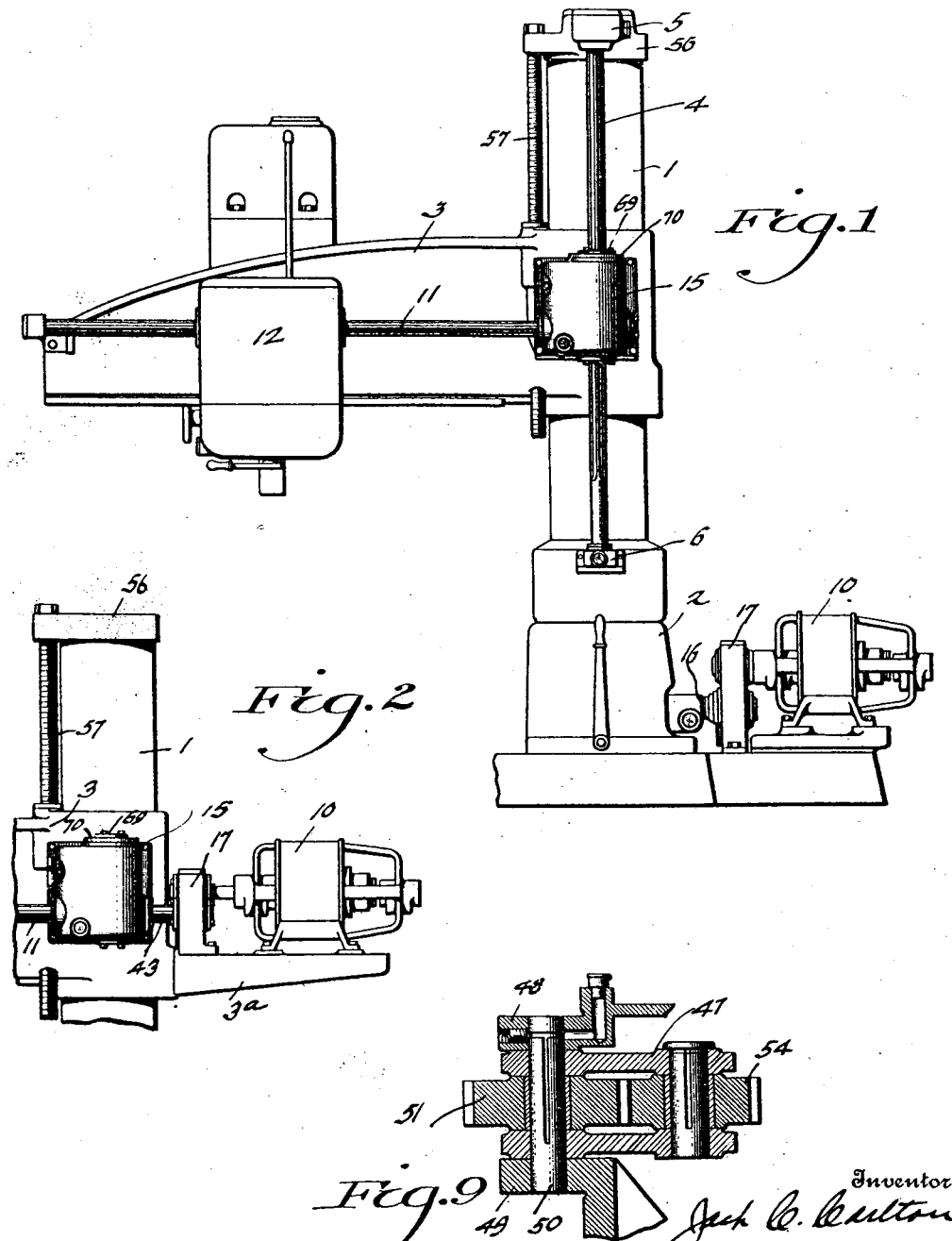

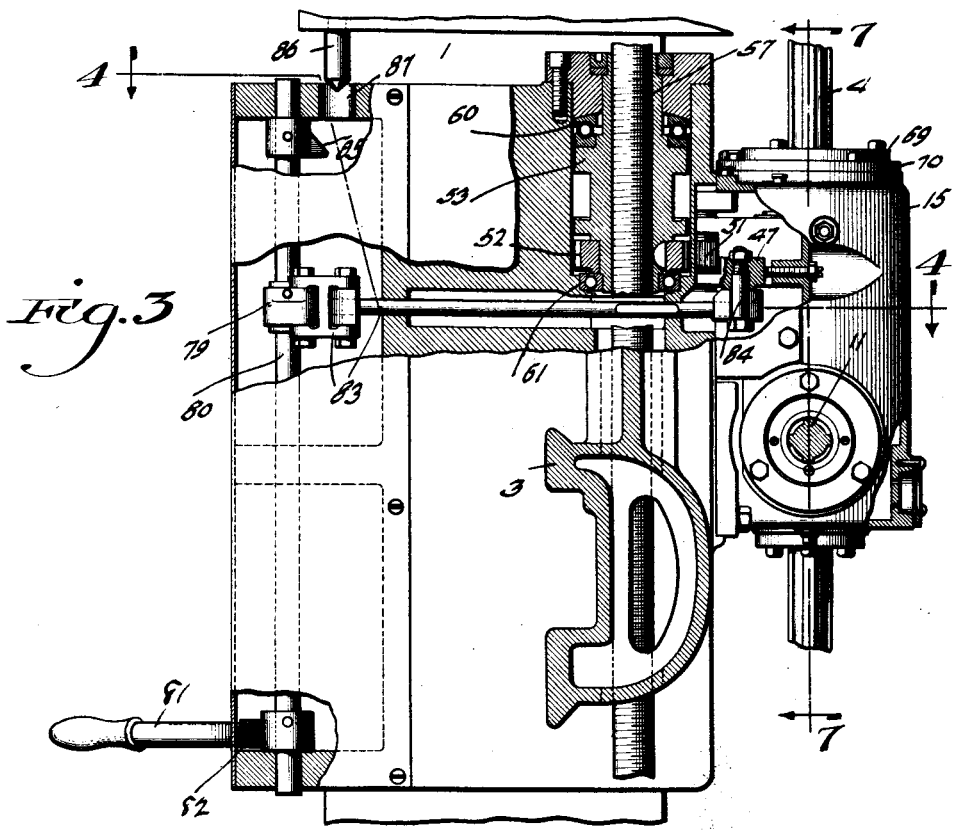

Inventor:
Jack C. Carlton

By
Wood & Wood
Attorneys

Patented Sept. 11, 1928.

1,684,344

UNITED STATES PATENT OFFICE.

JACK C. CARLTON, OF CINCINNATI, OHIO, ASSIGNOR TO THE CARLTON MACHINE TOOL COMPANY, OF CINCINNATI, OHIO, A CORPORATION OF OHIO.

TRANSMISSION FOR RADIAL DRILL ARMS, ELEVATING MECHANISM, AND DRILL SPINDLES.

Application filed January 9, 1926. Serial No. 80,318.

This invention relates to improvements in machine tools, and has for one object to provide a radial drilling machine in which power means, such as an electric motor, can be transmittably connected with an organized commercial machine either at the base of the column or at the arm, without change in the transmission gearing, the removal or replacement of one shaft only being necessary according as the power means is mounted upon the arm or upon the base.

Another object of the invention is to provide a transmission unit for a radial drill adapted to be mounted upon the arm, to form an oil reservoir when so mounted, and further adapted to establish transmission connection between the column shaft, and the arm raising and spindle operating mechanisms, in such manner that power can be applied either through the column with the power unit mounted upon the base, or directly through the arm shaft with the power unit mounted upon the arm, such alternate connections capable of being made without change in the arm raising and reversing and spindle operating mechanisms.

An important feature of the invention resides in independently rotatably mounting certain meshed bevel gears in the casing, attached to the back of the arm, to permit a column shaft and an arm shaft to be connected with respective gears, or to be removed therefrom or rearranged, to constitute either gear a driver for operating both spindle and arm raising mechanisms.

Another object is to provide means of the above nature, whereby a power unit can be mounted upon the arm, and power attached directly to the arm shaft, co-axially therewith.

Another object is to provide an automatic safety reversing device for preventing the arm from over-travelling in an upward direction, the device acting to reverse the direction of travel of the arm as it all but reaches its upper limit.

My invention is particularly useful in connection with a radial drilling machine wherein it is desired to use an electric motor as a driver, and to permit of the motor to be mounted either upon the base of the machine or upon the arm, without requiring changes in the column raising and drill operating transmission gearing.

Other objects and certain advantages will be more fully set forth in the description of the accompanying drawings forming a part of this specification, in which:

Figure 1 is an elevation of a radial drill showing my invention mounted upon the arm, with the power applied through the column shaft, and with the motor mounted on the base of the machine.

Figure 2 is a fragmentary view showing the power applied directly to the arm shaft, with the motor mounted upon the arm.

Figure 3 is a section through the arm, the parts broken away to show portions of the arm raising, and automatic safety arm reversing mechanism.

Figure 4 is a plan section on line 4—4 of Figure 3, showing one position of the trip element.

Figure 5 is a fragmentary plan showing a second position of the trip element.

Figure 6 is a detailed vertical section on line 6—6 of Figure 5, showing the trip elements engaged.

Figure 9 is a vertical section on line 9—9 of Figure 8, through the reversing plate.

Figure 7:
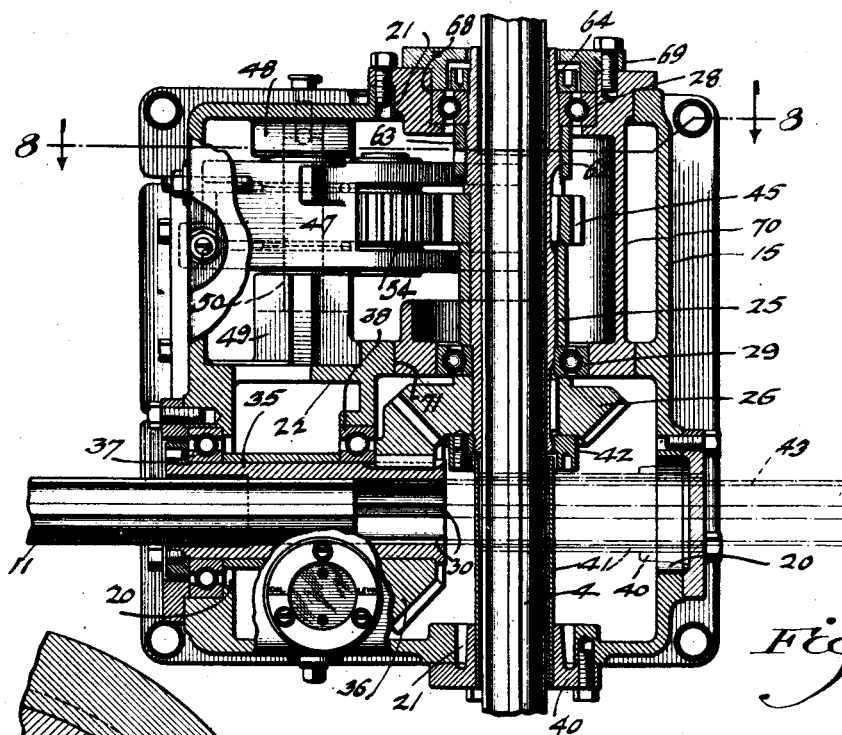
Figure 7 is a vertical section of the transmission casing on line 7—7 of Figure 3.

The invention is shown in Figure 1 applied to a type of radial drill having an arm-carrying sleeve 1 rotatably mounted upon a tubular column 2, the arm 3 being elevated or lowered upon the sleeve and the sleeve rotated or swung about the column. A transmission shaft, not shown, is journalled in and extends vertically interiorly of the column and this shaft at its upper end is transmittably connected with a vertical exteriorly mounted sleeve or column shaft 4 journalled in upper and lower bearings, 5, 6, upon the sleeve. The lower end of the interior column shaft is connected through suitable transmission gearing with a motor 10 mounted upon the base of the machine, and by means of this motor the outer or exterior column shaft 4 is rotated for operating the arm raising and drill head and drill operating mechanisms, the transmission gearing in the arm having an organized unit in which a change in driving shaft can be made, from the vertical to horizontal without change in gear arrangement nor need it be dismantled to make the change. The shafts are susceptible to be removed by a sliding disconnection.

Journalled upon the arm horizontally is an arm shaft 11 which traverses the head stock 12 and is transmittably connected with the spindle operating mechanism therein. This arm shaft 11 is transmittably connected through transmission gearing journalled in a casing 15 mounted on the rear side of the arm with the vertical shaft 4 when the transmission is driven from a motor at the base of the column as represented in Figure 1, the shaft 4 being eliminated when the transmission gearing in the casing 15 is driven by a motor mounted directly upon the column. The casing 15 is attached at the inner end of the arm and independently journals and encloses the gearing, and journals the pinions and gears independent of their shafts.

The motor as shown in Figure 1, is transmittably connected with the drill operating shaft intermediately, through a shock absorbing device 17, a structure which forms no part of this invention. The motor shaft can however be elongated and coupled directly with the stump knee shaft 16. The motor connection with the interior column shaft can be made in any well known manner either direct with the motor shaft or intermediate transmission gearing between the motor shaft and inner column shaft.

Figure 8:
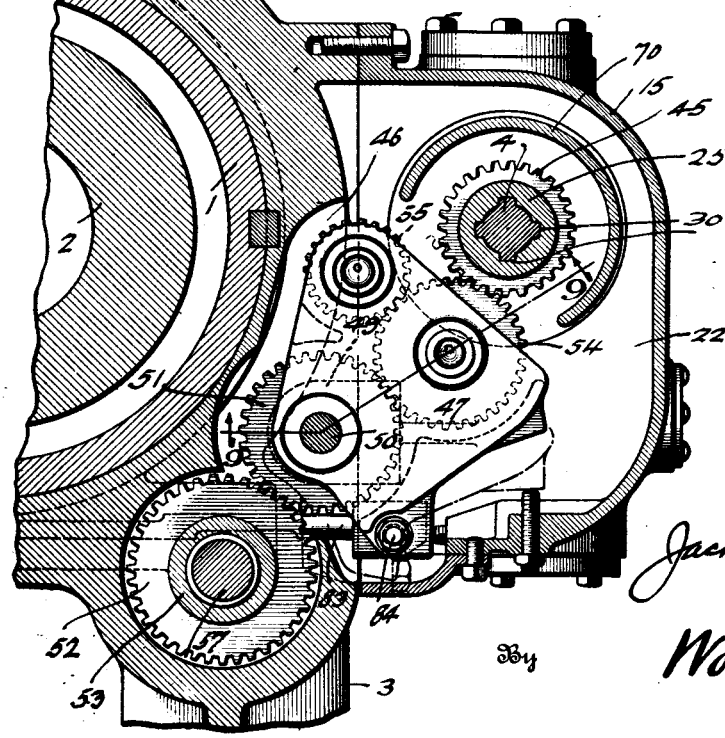
Figure 8 is a plan section on line 8—8 of Figure 7, more clearly showing the reversing mechanism.

Referring particularly to Figures 7 and 8, the transmission casing 15, providing an oil type casing in which the gears are journalled, is bolted to the rear side of the arm adjacent the column. This transmission unit provides the drive for the drill spindle and arm elevating mechanisms, the invention herein being primarily directed to the transmission unit mounted on the arm, which can be driven from shafts disposed in relatively angular planes. The casing has right angularly related pairs of aligned openings 20, 21, therein to permit the free introduction through the casing of correspondingly related shafts, one the exterior column shaft 4 and the other the arm shaft 11. The casing is further divided horizontally by a partition 22.

A vertically disposed sleeve 25, tubular shaft, or hub extension of the bevel gear 26 is journalled in upper and lower bearings 28, 29, of the casing, and the hub of this gear or journal, is interiorly longitudinally grooved as at 30 for sliding or splined connection with the castellated exterior column shaft. The journal can either be made separately, and a bevel gear keyed thereto at its lower end as herein shown, or the sleeve can form an integral part or hub extension of the gear, and in the latter case I designate this a bevel sleeve gear.

A substantially similarly constructed sleeve 35, having the bevel gear 36 keyed thereon at its inner end, is journalled horizontally in bearings 37, 38, in the lower portion of the reservoir casing, and the beveled gears 26, 36, are meshed and constantly remain so. The exterior column shaft is splined to the vertical hub extension and extends freely through the opening in the opposite wall of the casing axially aligned with the axis of the hub or sleeve. This opening is preferably closed by a cap 40 having an inwardly upwardly extended protecting sleeve 41, the said sleeve having its end disposed within a cavity of the gear or within the bore of an annular nut 42 which in this instance secures the gear to the sleeve hub.

This independent mounting of the bevel gears permits the shafts to be disengaged or withdrawn, always leaving the gears in fixed meshed relation, and allows the column shaft to be connected with or disconnected from the gear 26 so that shaft 43 or its equivalent can be connected with gear 36 to constitute that gear a driver for spindle and arm operation.

The arm shaft enters the sleeve 35 from the left, and is splined or keyed thereto but extends only partially therethrough, so that a shaft 43 introduced through the axially aligned opening 20 in the right wall of the casing can also be engaged with the bore of the sleeve and transmittably connected therewith.

After the shaft 49 of the power unit has been coupled as shown in dot and dash lines in Figure 7, the cap and sleeve 40, 41, are transposed from opening 21 to opening 20 and positioned as shown in dot and dash lines.

As an example of the utility of the device as a means for alternately connecting power to base or arm without change in the transmission gearing of the arm, let it be supposed that the drill is sold with a motor mounted on the base and transmittably connected with the interior column shaft through the stump knee shaft 16 as shown in Figure 1. If at any future time it is desired to mount the motor upon the arm and to suitably connect the same for operating the arm raising and head and drill mechanisms, it is only necessary to attach a bracket 3ª, to the arm, as shown in Figure 2, remove the exterior column shaft from the upward vertical sleeve extension, and directly direct the power to the lower sleeve through a short castellated shaft which is passed through the opening 20 at the right side of the casing and non-rotatably engaged in the bore of said horizontally disposed sleeve as shown in dot and dash lines, Figure 7.

*Arm raising, lowering, and reversing transmission mechanism.*

The connection between the bevel gear transmission members, for raising and lowering, and reversing the directions of travel of the arm, is partly made by means of a spur gear attached to the vertically disposed hub extension or sleeve, and for this purpose certain reversing and transmission gearing is mounted on the arm, but extends into the casing.

Keyed to the hub extension or sleeve 25 is a spur gear 45, as one element of a reversing transmission mechanism connecting said hub extension with an arm raising nut 53 rotatably mounted on the arm.

The back of the arm is recessed as at 46 to provide clearance for the reversing plate 47 and to receive the bearings 48, 49, upper and lower, which project horizontally from the back of the casing 15, one depending from the top of said casing and one extending upwardly from the horizontal partition 22. These bearings support the vertical shaft 50 on which the reversing plate is pivoted, and this shaft also journals a spur gear 51 which is in constant mesh with a spur gear 52 keyed to the nut 53. Second and third gears 54, 55, form part of a reversing transmission train, the three gears being in constant mesh and the latter gears being both disengageable from or alternately engageable with the gear 45 of the hub 25, as the plate is swung.

The column cap 56 has attached thereto a depending stationary screw 57 which freely traverses the arm and has threaded connection with a revolving nut 53 journalled vertically as at 60, 61, in the arm (see Figure 3). The journals are in the form of thrust bearings, and the lower end of the nut is shouldered and the spur gear 52 is keyed to the counter-turned portion, forming the shoulder. The reversing transmission connections between this spur gear of the nut and the spur on the sleeve is best shown in Figure 8, and this mechanism comprises the plate 47 separately pivotally mounted upon the vertical shaft 50. The gear 51 is rotatably mounted on this shaft and lies within a groove portion of the plate.

The casing, when bolted to the side of the arm, is adapted to act as an oil reservoir, and for this purpose has sight openings in its side walls adjacent the lower portions, (see Figures 3 and 7). These sight openings are covered and sealed by glass plates, and the oil lever within the casing can be observed, a splash lubrication being obtained by the revolving lower bevel gear.

An oil reservoir and mounting for various parts of a transmission and reversing transmission gearing is thus provided which may be conveniently attached to or detached from the arm.

To permit and facilitate the removal of the hub extension or sleeve 25 and gear attached thereto, without removal of the sleeve from its bearings, the bearings for said sleeve are mounted in a removable housing 70 which is suitably fitted in upper and lower openings 21, 71, of the casing 15.

The hub extension sleeve 25 is mounted in this housing 70 in a manner to also readily permit of the removal of the bearings, sleeve and bevel gear from the housing, and in this construction the back of the bevel gear 26 forms a shoulder which engages against the lower bearing 29.

A sleeve is interposed between the bearing 29 and the gear 45. The gear 45 at the upper side is supported against a shoulder formed by counter-turning the sleeve or hub 25. Adjacent to this shoulder, and extending toward the upper end of the hub are screw threads 62 which are engaged in a threaded collar 63, the upper end of which abuts the lower side of the upper bearing 28. At the opposite side of the bearing 28 and on a counter-turn portion of the sleeve are formed additional threads 64 with which are engaged an annular nut 65 which engages against the upper side of the bearing 28. The sleeve or hub extension is thus held against translative movement, and may be conveniently removed from the housing 70 for repairing or replacement. The opening 68 is shouldered to receive the bearing 28 and the cylindrical extension of a cap 69 engages the upper side of the outer ring portion of the bearing 28 and suitably held in position by screws.

As above mentioned the bearings 28, 29, are supported in a removable housing 70 which is flanged at its upper end and said housing is held and secured within openings 21, 71, respectively at the top of the housing, and of the horizontal partition 22. This housing is held in position by screws, and when it is desired to remove the bevel gear and sleeve, the whole housing including the bearings may be drawn upwardly and outwardly. The housing is of hollow cylindrical formation and a portion of the cylindrical wall is cut away to permit the terminal members of the reversing plate gear train to engage the spur gear 45 of the sleeve 25.

Before the casing can be removed in the above mentioned manner, the pivot pin 50 or journal for the reversing plate 47 must be removed vertically and the plate disengaged. However, the whole oil reservoir casing can be also removed by disengaging the bolts, but this operation can only be performed after the shaft 4 has been removed.

*Reversing mechanism control device.*

The reversing plate may be operated manually in any preferred manner, but is herein controlled through a manually and automatically operable arm reversing safety device, comprising a shaft 80 vertically mounted in the arm (see Figures 3, 4, 5, and 6). This shaft is suitably journalled in upper and lower bearings of the arm and has near its lower end a hand lever 81 extending outwardly through a slot 82 in the frame, or through a cover attached to the frame. A crank arm 79 extends from the shaft 80, and a double link connection 83 is provided between this arm and the plate, one end of the link being connected as at 84 to the plate. Thus when the shaft is rotated in opposite directions, the plate is correspondingly moved to bring either one or the other of the gears 54, 55, in mesh with the sleeve gear 45 for obtaining reverse motions of the nut and arm. Suitable adjustable stops limit plate swing.

*Automatic trip for reversing mechanism.*

In order to automatically reverse the direction of travel of the arm as it nears its upper limit, a radial cam is provided upon the shaft 80, said cam having an inclined face 85 engageable by a pin 86 depending from the cap plate 55 of the column. An opening 87 is provided in the top of the arms, and the pin is adapted to pass through this opening and engage the inclined face of the cam, (see Figures 5 and 6). When the cam is in the position shown in Figure 5, the pin 86 will engage the cam and the shaft will be rotated to shift the plate 47 to bring the gear 54 in mesh with the gear 45 for obtaining a reverse or downward movement of the arm. The position of the lever in Figure 4, corresponds to the position of the plate shown in Figure 8, wherein the gear 54 is meshed with the gear 45 for obtaining a downward movement of the arm. When the lever 81 is positioned as in Figure 5, the small gear 55 is engaged with the gear 45 and the arm is travelling upwardly.

The relation of the inclined face of the cam to the opening 87 in the top of the casing is best shown in Figure 6, the control shaft is thrown into counter-clockwise direction, correspondingly swinging the plate and bringing the larger gear 54 into mesh with gear 45.

Having described my invention, I claim:

1. A radial drilling machine including a column, an arm translatable upon the column, a shaft journalled in the arm and extending longitudinally thereof, a transmission casing mounted upon the rear side of said arm, meshing bevel gears each having a sleeve hub journalled in the casing for journalling its gear independently of a shaft connecting with the gear, one of said gears connecting with said arm shaft and the second bevel gear adapted to be connected with a driving shaft, arm elevating transmission mechanism having driving connection with the second bevel gear, both of said bevel gears splined for the reception of the power driving shaft, adapting the power shaft to be selectively connected to either of said gears for transmitting the same, in one position coextensive with the arm shaft and the second at right angles thereto.

2. A radial drill including a column, an arm translatable on the column, a transmission casing upon the arm having two meshed bevel gears independently journalled therein adapted for connection respectively with a column shaft, and an arm shaft, arm raising mechanism connected with one of the gears, said casing having openings in its walls one in axial alignment with and in opposition to each gear for permitting a corresponding shaft to traverse the casing and be connected with or disconnected from a corresponding gear, to alternately constitute either gear a driver.

3. An arm elevator casing for a radial drill, as a transmission unit, attachable to the arm, having meshed bevel gears therein, each gear having a hollow hub extension independently rotatably supported within the casing, each sleeve adapted for splined connection respectively with a column shaft or arm shaft, said casing having openings through its walls, one axially aligned and in opposition to each gear for permitting a corresponding shaft to traverse the casing and to be connected with either gear to constitute that gear a driver.

4. An arm elevator for a radial drill including a casing attachable to the arm, meshing bevel gears independently journalled in the casing, each adapted to transmittably connect with a shaft, said casing having openings, one axially aligned with each gear and at the opposite wall of the casing for permitting a shaft to traverse the casing and connect with a gear whereby a shaft can be introduced through a corresponding opening and operably connected with a corresponding gear to constitute that gear a driving member without disturbing the meshed relation gears.

5. A drill including a column, an arm vertically translatable upon the column, vertical and horizontal meshing bevel gears rotatable upon the arm, an arm shaft keyed to the horizontal gear and extending partially therethrough, so that a second shaft can be connected with the gear in coaxial relation, bearings on said column one above and one below the vertical gear, axially aligned with the axis of said vertical gear, said bearings adapted to removably support an exterior column shaft, when passed through the vertical gear, permitting said vertical gear to be constituted a driving element, and further permitting said horizontal gear to be constituted a driving element, when said exterior column shaft is disconnected, without disturbing the meshed relation of said bevel gears.

6. In a radial drill, a column, an arm translatable on the column, meshing bevel sleeve gears independently journalled upon the arm, an elevating screw on the column, a nut for said screw journaled on the arm, a column shaft splined to the sleeve of one of said gears, an arm shaft keyed to the sleeve of the other gear, and reversing transmission gearing within the casing connecting the nut and one of the sleeve gears, said casing having openings opposingly related to each sleeve gear for permitting introduction of a shaft through the casing and corresponding gear, adapting said sleeve gears to be selectively connected with a power shaft for driving the same.

7. A radial drill including a column, an arm translatable upon the column, meshing bevel gears each having a hollow hub extension journalled upon the arm, an elevating screw for the arm, a nut for said elevating screw, reversing transmission gearing upon the arm connecting said nut with one of said hub extensions, a column shaft passing through one of the hub extensions and having splined connection therewith, and an arm shaft keyed to the other hub extension and passing partially therethrough, whereby by removal of the column shaft, the shaft of a motor can be directly connected with that hub extension keyed to the arm shaft, thus permitting this extension to function as a driving element without affecting the operation of or requiring changes in said meshing bevel gears or said reversing transmission gearing.

8. A radial drill including a column, an arm translatable upon said column, sleeves journalled upon the arm at right angles to one another, meshing beveled gears one on each sleeve, said casing having openings one axially aligned with each sleeve for permitting shafts to traverse sleeves and casing, an elevating screw for the arm, a nut for said screw journalled in said casing, reversing transmission gearing connecting said nut with one of said sleeves, a column shaft passing through one of the sleeves and casing, and having splined connection therewith, and an arm shaft keyed to the other sleeve and passing partially therethrough, whereby either sleeve can be constituted a driving element without affecting the operation of or requiring changes in said reversing transmission gearing.

9. A radial drill including a column, an arm translatable upon the column, meshing bevel gears each having a hollow hub extension journalled upon the arm, an elevating screw for the arm, a nut for said screw, reversing transmission gearing upon the arm connecting said nut with one of said sleeves, a column shaft passing through one of the hubs and splined thereto, and an arm shaft keyed to the other sleeve and passing partially therethrough, whereby shafts can alternately be connected to either one or the other of the gears so that either gear can act as a driving element without affecting the operation of or requiring changes in said meshing bevel gears or said reversing transmission gearing.

In witness whereof, I hereunto subscribe my name.

JACK C. CARLTON.